(12) United States Patent
Arcella et al.

(10) Patent No.: US 7,915,356 B2
(45) Date of Patent: Mar. 29, 2011

(54) POLYMERISATION PROCESS

(75) Inventors: Vincenzo Arcella, Milan (IT); Valeri Kapeliouchko, Alessandria (IT); Stefano Ferrero, Cuneo (IT); Aniello Gargiulo, Alessandria (IT)

(73) Assignee: Solvay Solexis S.p.A., Milan (IT)

( * ) Notice: Subject to any disclaimer, the term of this patent is extended or adjusted under 35 U.S.C. 154(b) by 47 days.

(21) Appl. No.: 12/296,216

(22) PCT Filed: Apr. 6, 2007

(86) PCT No.: PCT/EP2007/053418
§ 371 (c)(1),
(2), (4) Date: Oct. 6, 2008

(87) PCT Pub. No.: WO2007/116031
PCT Pub. Date: Oct. 18, 2007

(65) Prior Publication Data
US 2009/0108501 A1    Apr. 30, 2009

(30) Foreign Application Priority Data
Apr. 11, 2006  (EP) .................................. 06112472

(51) Int. Cl.
*C08F 2/18* (2006.01)
*C08F 2/00* (2006.01)
*C08J 5/00* (2006.01)
*B01J 19/18* (2006.01)

(52) U.S. Cl. .......... 526/88; 526/247; 526/918; 422/135; 264/238; 264/331.14

(58) Field of Classification Search .................. 526/88, 526/918, 247; 422/135
See application file for complete search history.

(56) References Cited

U.S. PATENT DOCUMENTS

| 2,209,287 A | 7/1940 | Simpson |
| 3,245,972 A | 4/1966 | Anderson et al. |
| 3,330,818 A | 7/1967 | Derby |

(Continued)

FOREIGN PATENT DOCUMENTS

EP    0613717 A2    9/1994

(Continued)

OTHER PUBLICATIONS

Ajroldi, G., et al. Some Rheological Properties of molten Polytetrafluoroethylene. J. appl. polym. sci.. 1970, vol. 14, p. 79-88 (10 pg.).

(Continued)

*Primary Examiner* — Fred M Teskin
(74) *Attorney, Agent, or Firm* — Arent Fox, LLP

(57) ABSTRACT

A fluoropolymer [polymer (F)], a polymerisation process for its manufacture, and a molding process using such fluoropolymer [polymer (F)].

The polymerisation process comprises polymerising at least one fluorinated monomer in a polymerization medium, in which the polymerization medium is mixed by means of a stirring system comprising at least two counter-rotating impellers. Surprisingly and advantageously, the polymerization occurs without fouling or deposit formation on the reactor walls, and moreover, occurs with improved homogeneity, without composition, pressure or temperature gradients, thus enabling obtaining homogeneous polymer composition with no risk of local overheating.

A polymer (F) obtained from such process has improved morphology (percentage of organized structures, i.e. of particles of regular shape) and, hence, has good free flowing properties which make it suitable for being processed by compression molding with no need of intermediate milling or grinding process or other size reduction process.

9 Claims, 5 Drawing Sheets

U.S. PATENT DOCUMENTS

| | | | |
|---|---|---|---|
| 3,434,804 A | * | 3/1969 | Winn .................... 422/135 |
| 3,462,401 A | | 8/1969 | Kometami et al. |
| 3,578,649 A | | 5/1971 | Badguerahanian et al. |
| 3,870,691 A | | 3/1975 | Grimaud et al. |
| 4,025,481 A | | 5/1977 | Tournut et al. |
| 4,277,585 A | | 7/1981 | Fournel et al. |
| 4,428,680 A | | 1/1984 | Persson et al. |
| 4,475,820 A | | 10/1984 | Mulligan |
| 4,497,911 A | | 2/1985 | Rigler et al. |
| 4,729,878 A | | 3/1988 | Pommier et al. |
| 5,760,148 A | | 6/1998 | Muller et al. |
| 6,252,018 B1 | | 6/2001 | Rupaner et al. |
| 6,262,209 B1 | | 7/2001 | Kapeliouchko et al. |

FOREIGN PATENT DOCUMENTS

| | | |
|---|---|---|
| EP | 1469016 A1 | 10/2004 |
| EP | 1640064 A1 | 3/2006 |
| FR | 2397224 A1 | 2/1979 |
| GB | 2158727 A | 11/1985 |
| JP | 3265602 | 11/1991 |
| JP | 3265603 | 11/1991 |

OTHER PUBLICATIONS

ASTM Method D 6393-99 (8 pg.), (Published Jul. 1999).

PCT International Search Report dated Jun. 8, 2007 for International Applciation No. PCT/EP2007/053418 (3 pg.).

* cited by examiner (A) (B) (C) (D) (E) (F)
(G) (H) (I) (L) (M) (N)

POLYMERISATION PROCESS

CROSS-REFERENCE TO RELATED APPLICATIONS

This application is a U.S. national stage application under 35 U.S.C. §371 of International Application No. PCT/EP2007/053418, filed Apr. 6, 2007, which claims priority to European Application No. 06112472.3, filed Apr. 11, 2006, all of these applications being herein incorporated by reference in their entirety for all purposes.

TECHNICAL FIELD

The invention pertains to a process for polymerising fluorinated monomer, to a fluoropolymer, and to a moulding process for moulding fluoropolymer.

BACKGROUND ART

Almost all industrial processes for the polymerisation of fluoropolymers are based on the polymerization of a fluorinated monomer in a liquid phase in a mixed reaction vessel. Such polymerisation processes generally require reactants to be kept in intimate contact by means of a mixing flow. In such multiphase chemical reactions, especially tetrafluoroethylene (TFE) polymerisation, complicated phenomena of convection, diffusion and mass transfer among different phases (liquid/gas/solid) of the reactants are involved.

Suitable mixing devices are generally comprised in the polymerisation devices enabling notably:
1. homogenization, i.e. equalization of differences in concentration and temperature so as to avoid spatially dependent polymerization rates;
2. intensification of the heat transfer between the liquid and the heat-generating interface;
3. suspension of the solid in the liquid;
4. dispersion of the gaseous fluorinated monomer in the aqueous liquid phase.

If mixing is not effective, segregated regions can be found which generally increase by-products generated during the reaction.

In the case of the gas-liquid-solid reaction associated with the fluorinated monomer polymerisation in aqueous phase, it is generally understood that the reaction takes place between a reactant (i.e. the gaseous fluorinated monomer) in gas phase and the active sites in solid phase (i.e. the growing polymer chain), and that the liquid typically plays, inter alia, the role of withdrawing the enthalpy of the reaction.

In fluorinated monomer polymerization, the presence of segregated zones of solids, generally characterized by low thermal conductivity and where the gas can diffuse into the solid porosity, can disrupt temperature homogeneity and yield local temperature gradients. Such hot spots are to be avoided because they could engender thermal decomposition of monomers or polymers. When local overheating takes place in TFE polymerization, run-away reactions can lead, in addition to polymer sintering, to ignition and deflagration of monomeric TFE. For safety considerations, it is thus fundamental to achieve a homogeneous removal of the heat of polymerisation, especially in case of TFE.

Generally, to improve the homogeneity of the polymerisation medium in the reactor and avoid solid build-up and segregated zones:
fluorinated monomers polymerisation processes are carried out using high shear impellers with good pumping efficiency (to avoid solid settling); and
fully baffled reaction vessels (to obtain more uniform conditions) are used.

Thus, U.S. Pat. No. 3,245,972 B (DUPONT DE NEMOURS) 12, Apr. 1966 discloses a process for obtaining a polytetrafluoroethylene (PTFE) molding powder, said process comprising polymerizing tetrafluoroethylene (TFE) in aqueous medium using stirring equipment with power consumption in the range 0.0004 to 0.002 kg m/sec/ml and with a ratio of power to discharge coefficient of at least 1.4. Different types of impellers are disclosed, such as, notably, a vertically disposed flat paddle, a stirrer with flat blades pitched at an angle of 15 degrees to the horizontal, a marine propeller and a bladed propeller having horizontal shear tips; a flat blade paddle stirrer arranged vertically with ratio of power to discharge coefficient of 3.4 is preferred.

U.S. Pat. No. 3,462,401 B (DAIKIN KOGYO CO., LTD) 19, Aug. 1969 disclose a process for the preparation of nearly spherical granular PTFE molding powder, said process comprising polymerizing in presence of a water insoluble organic liquid under vigorous stirring. The reaction device is a polymerisation vessel equipped with either an anchor type agitator or a four-vaned propeller in its bottom.

U.S. Pat. No. 5,760,148 B (DYNEON GMBH) 02, Jun. 1998 discloses the suspension polymerisation of TFE for obtaining uniform, compact and spherical grains of PTFE in a reactor equipped with a stirrer element generating both an axial flow component and a tangential flow component, with formation of a vortex in vicinity of the stirrer element, optionally by means of rotatable baffles without producing dead water zones.

One of the main disadvantages that arise when mixing a liquid/solid medium is the creation of a steady whirling or rotation of the mixture about the reaction vessel in a constant path, so that the actual intermingling of mixture is reduced and a void cone or vortex is generated around the shafts of the propellers.

It has been thus proposed of employing stationary baffle plates to break said excessive whirling motion.

Nevertheless, baffles have several drawbacks, notably:
in presence of sticky solids, said solids build-up in dead zone, typically behind the baffle.
when shear sensitive materials are present, locally stronger stirring must be avoided, since it increases the particle segregation with damage the material;
in TFE polymerization, the formation of uncontrolled solid polymer build-up is extremely dangerous, as said solid can directly react with gaseous TFE with no heat removal by the aqueous medium; consequent local overheating may cause TFE deflagration.

In view of the above, alternative mixing devices have been proposed in the past in other domains of chemical industry for assuring better mixing of multiphasic liquid/solids systems.

Thus, U.S. Pat. No. 2,209,287 B (SIMPSON W. L.) 23, Jul. 1940 discloses a mixing device comprising a tank and a mixer having two coaxially mounted propellers of different sizes and means for driving said propellers in opposite directions.

U.S. Pat. No. 3,330,818 B (MONSANTO CO.) 11, Jul. 1967 relates to an improved process for the low pressure polymerization of olefins, especially ethylene, wherein a mixing system comprising two impellers mounted on coaxial separate shafts (one from the top, one from the bottom) rotating in opposite directions is used for forming a high turbulence zone, yielding a significant reduction in plating.

GB 2158727 (CHEM-PLANT STAINLESS LIMITED) 20, Nov. 1985 discloses a generally cylindrical mixer vessel comprising a central shaft extending vertically and carrying an agitator rotatable about the axis of said shaft in one direction and stirrer blades rotatable about the axis of the shaft in the opposite direction.

U.S. Pat. No. 6,252,018 B (BASF AG) 26, Jun. 2001 relates to a stirring system device particularly suitable for the emulsion polymerisation of ethylenically unsaturated monomers, said stirring system comprising multistage, very close-clearance stirring elements, which produce not only a tangential flow component but also an axial flow field.

It is also understood that polymer particles morphology and shape factors as well as comonomer distribution are strongly influenced by the mixing flow; particle size distribution and particle shape is notably affected by the mixing energy distribution, by the shear force, by the presence of dead zones, etc.

U.S. Pat. No. 6,262,209 (AUSIMONT S.P.A.) 17, Jul. 2001 discloses a process for producing modified PTFE by suspension polymerization, said process allowing obtaining at high productivity a product having improved processing features. Said polymerization process comprises polymerizing a mixture of TFE and a perfluoroalkyl vinyl ether and/or a perfluorodioxole comonomer at a pressure from 15 to 30 bar with a perfluorinated surfactant in the presence of a buffering salt, and a persulfate and a reducing agent as initiator. According to U.S. Pat. No. 6,262,209 (AUSIMONT S.P.A.) 17, Jul. 2001, provided that the comonomer is added during polymerization so as to maintain a constant incorporation rate and that a perfluorinated surfactant is used to improve comonomer uniformity, it is possible to obtain a modified PTFE suspension polymer powder using standard stirring equipments with good homogeneity in knived tapes (no transparent halos nor marbleization).

In the case of TFE suspension polymerization, the absence of baffles and the consequent oriented fluid flow generally generates oriented particle growth, leading to highly non-homogeneous particle having asymmetric shapes. Such asymmetric particles are not suitable for industrial use; subsequent particles seizing or further treatments are required for obtaining homogeneous powders for the industrial use.

There is thus a need in the art for a polymerisation process comprising a more efficient mixing system, assuring homogeneity in temperature and composition of the polymerisation medium, avoiding dead zones, enabling uniform turbulence intensity distribution.

There is also a need for a polymerization process enabling obtaining homogeneous mixing state at low and high shear conditions, without the use of mechanical baffles and thus avoiding the related dead zone problems.

There is finally a need in the art for a polymerisation process enabling manufacture of homogenous spherical powder particles, which have suitable morphology and shape factors which make them suitable for industrial use (e.g. for moulding) with no further grinding nor size reduction post-treatment.

All these problems and other are remarkably solved by the polymerisation process of the invention.

DISCLOSURE OF THE INVENTION

Figure 1:
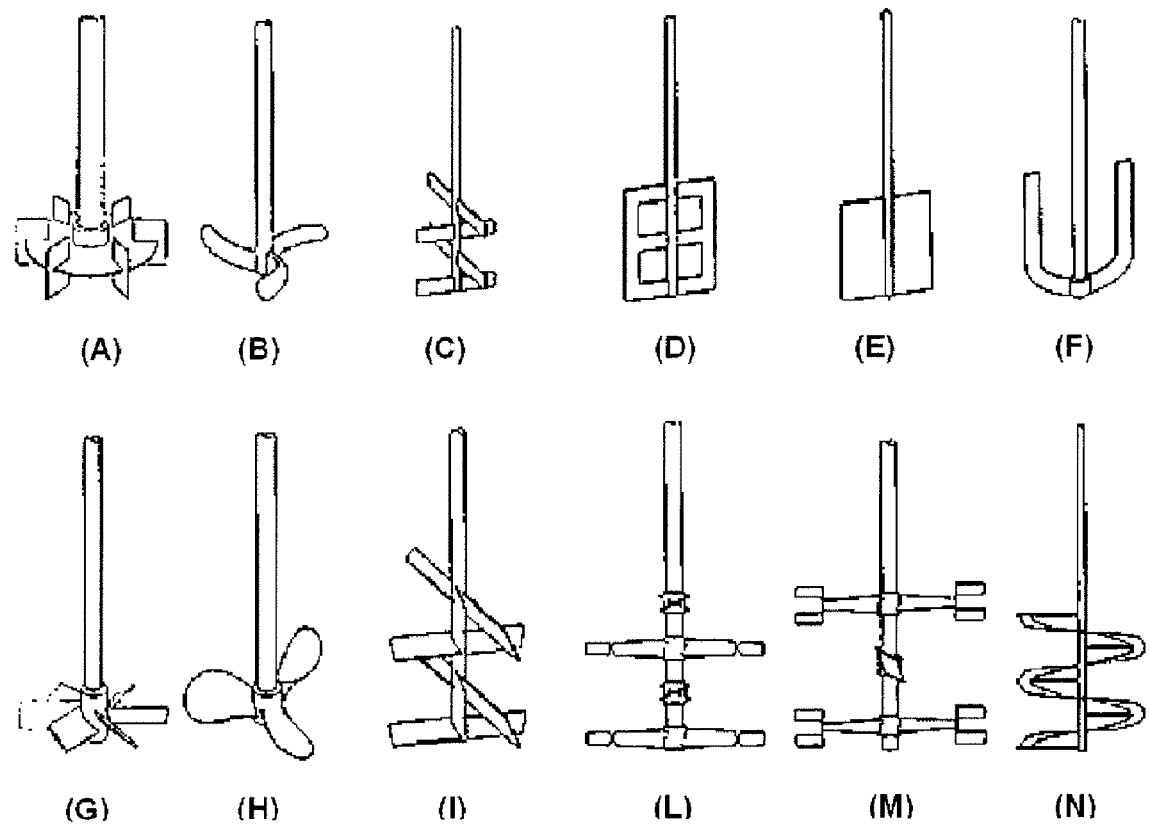
FIG. 1 shows stirrer types (A)-(N).

A first object of the invention is a polymerisation process for the manufacture of a fluoropolymer [polymer (F)], said process comprising polymerising at least one fluorinated monomer in a polymerization medium, wherein said polymerization medium is mixed by means of a stirring system comprising at least two counter-rotating impellers.

It has been surprisingly observed that the polymerization advantageously occurs without fouling or deposit formation on the reactor walls.

Moreover, the polymerization process advantageously occurs with improved homogeneity, without composition, pressure or temperature gradients, thus advantageously enabling obtaining homogeneous polymer composition with no risk of local overheating.

Moreover, polymer (F) obtained from the process of the invention possesses advantageously improved morphology (percentage of organized structures, i.e. of particles of regular shape) and, hence, advantageously good free flowing properties which make it suitable for being processed by compression moulding (e.g. automatic moulding; RAM extrusion) with no need of intermediate milling or grinding process or other size reduction process nor of granulation or spheroidization process.

Still an object of the invention is a fluoropolymer [polymer (F)] under the form of particles having a sphericity shape factor ($L_{max}/L_{min}$) of 1.5/1 or less and an angle of repose of 40° or less.

Another object of the invention is a moulding process for the manufacture of a moulded article, said process comprising:
polymerizing at least one fluorinated monomer in a polymerization medium, wherein said polymerization medium is mixed by means of a stirring system comprising at least two counter-rotating impellers, so as to obtain a fluoropolymer [polymer (F)]; and
compression moulding said polymer (F) to obtain a moulded article, wherein the polymer (F) is not submitted to any size reduction step prior to compression moulding.

The moulding process of the invention is particularly advantageous, as moulded good are advantageously produced with substantial energy savings, as there is no need of size reduction process which are highly energy demanding.

Advantageously, polymerizing the fluorinated monomer in the polymerization medium provides a heterogeneous reaction mixture comprising the polymer (F) product in the polymerization medium.

The polymerization medium of the process of the invention advantageously comprises water. Preferably, the polymerization medium of the invention consists essentially of water, in which are generally either solubilized or dispersed the required polymerization ingredients (like notably one or more monomers, initiators, surfactants, etc.)

The term "heterogeneous reaction mixture" as used herein, refers to a reaction mixture having at least two phases. One phase is termed the "continuous phase", which comprises a fluid, preferably water, and the other is termed the "solid phase", comprising the polymer (F) product.

The term "heterogeneous reaction mixture" is intended to encompass the product of both dispersion polymerizations, in which the polymerization starts out homogeneous, and emulsion polymerizations, in which the polymerization starts out heterogeneous and the polymerization initiator is preferentially solubilized in the continuous phase. As used herein, a compound is "preferentially solubilized" in one phase over another when it is more soluble in that phase.

The polymerization medium of the present invention can be initially homogeneous, i.e. it is a medium wherein the fluorinated monomer(s), and all other optional polymerization ingredients (such as notably the initiator) are solubilized, and generally becomes heterogeneous as the polymerization proceeds and the polymer is formed. The newly produced polymer (F) advantageously forms the solid phase of the reaction.

The polymer can be notably stabilized as a dispersion of the solid phase by the presence of a suitable surfactant which reduces the surface tension between the phases. This type of polymerization processes is generally known as dispersion polymerization. A general description of dispersion polymerization can be found in BARRET, K. E. J. Dispersion Polymerization in Organic Media. London: Wiley, 1975; and in NAPPER, D. H. Polymer Stabilization of Colloidal Dispersion. London: Academic Press, 1983.

Should the process be carried out in dispersion, the polymerization medium advantageously comprises a surfactant.

The surfactant is preferably a fluorinated surfactant. The fluorinated surfactants of formula:

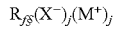

$$R_{fS}(X^-)_j(M^+)_j$$

are the most commonly used, wherein $R_{fS}$ is a (per)fluoroalkyl chain $C_5$-$C_{16}$ or a (per)fluoropolyoxyalkylene chain, $X^-$ is —COO⁻ or —SO₃⁻, M⁺ is selected from H⁺, NH₄⁺, an alkaline metal ion and j can be 1 or 2.

As non limitative examples of fluorinated surfactants mention may be made of ammonium and/or sodium perfluorocarboxylates, and/or (per)fluoropolyoxyalkylenes having one or more carboxylic end groups.

More preferably, the fluorosurfactant is chosen from:
$CF_3(CF_2)_{n1}COOM'$, in which $n_1$ is an integer ranging from 4 to 10, preferably from 5 to 7, and more preferably being equal to 6; M' represents H, NH₄, Na, Li or K, preferably NH₄;

$T(C_3F_6O)_{n0}(CFXO)_{m0}CF_2COOM''$, in which T represents Cl or a perfluoroalkoxide group of formula $C_kF_{2k+1}O$ with k is an integer from 1 to 3, one F atom being optionally substituted by a Cl atom; $n_0$ is an integer ranging from 1 to 6; $m_0$ is an integer ranging from 0 to 6; M'' represents H, NH₄, Na, Li or K; X represents F or CF₃;

$F$—$(CF_2$—$CF_2)_{n2}$—$CH_2$—$CH_2$—$SO_3M'''$, in which M''' represents H, NH₄, Na, Li or K, preferably H; $n_2$ is an integer ranging from 2 to 5, preferably $n_2$=3;

A-$R_f$—B bifunctional fluorinated surfactants, in which A and B, equal to or different from each other, are —(O)$_p$CFX—COOM*; M* represents H, NH₄, Na, Li or K, preferably M* represents NH₄; X═F or CF₃; p is an integer equal to 0 or 1; $R_f$ is a linear or branched perfluoroalkyl chain, or a (per)fluoropolyether chain such that the number average molecular weight of A-$R_f$—B is in the range 300-1,800.

A co-stabilizer is advantageously used in combination with the surfactant. Paraffins with a softening point in the range 48° C.-62° C. are preferred as co-stabilizers.

Otherwise, the polymer (F) can be present in the solid phase as discrete particles which are typically kept in suspension by mixing. This process is generally called suspension polymerization.

For the purpose of the invention the term "particle" is intended to denote a mass of material that, from a geometrical point of view, has a definite three-dimensional volume and shape, characterized by three dimensions, wherein none of said dimensions exceed the remaining two other dimensions of more than 20 times.

Preferably the process of the invention is carried out in suspension. The Applicant thinks, without this limiting the scope of the invention, that the vigorous stirring and the highly homogenous mixing achieved via the use of the stirring system comprising the counter-rotating impellers is particularly advantageous for suspension polymerization. Within this process, the so-obtained mixing can advantageously promote a precipitation of the polymer (F) under the form of very regular particles having spheroidal shapes.

Should the process be carried out in suspension, a small amount, typically from 1 to 1500 ppm, preferably from 5 to 1000 ppm, more preferably from 10 to 300 ppm of a fluorinated surfactant as above described can be used.

Optionally, a buffering salt at alkaline pH can be used. Suitable buffering salts at alkaline pH are notably alkaline metal pyrophosphates and/or ammonium or alkaline metal oxalates.

The process of the invention advantageously comprises polymerizing the fluorinated monomer in the presence of a radical initiator.

The radical initiators suitable for the process according to the invention are compounds capable of initiating and/or accelerating the polymerization.

The initiator is advantageously included in a concentration ranging from 0.001 to 20 percent by weight of the polymerization medium.

Those skilled in this art will be familiar with a number of initiators that are suitable for the process of the invention.

Organic free radical initiators can be used and include, but are not limited to, the following: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2, 4dimethylvaleronitrile; tert-butylperpivalate; dioctanoylperoxide; dilauroyl-peroxide; 2,2'-azobis (2,4-dimethylvaleronitrile); tert-butylazo-2-cyanobutane; dibenzoylperoxide; tert-butyl-per-2ethylhexanoate; tert-butylpermaleate; 2,2'-azobis(isobutyronitrile); bis(tert-butylperoxy) cyclohexane; tert-butyl-peroxyisopropylcarbonate; tert-butylperacetate; 2,2'-bis (tert-butylperoxy)butane; dicumyl peroxide; di-tert-amyl peroxide; di-tert-butyl peroxide; p-methane hydroperoxide; pinane hydroperoxide; cumene hydroperoxide; and tert-butyl hydroperoxide. Other suitable initiators include halogenated free radical initiators such as chlorocarbon based and fluorocarbon based acyl peroxides such as trichloroacetyl peroxide, bis(perfluoro-2-propoxy propionyl)peroxide, [CF₃CF₂CF₂OCF(CF₃)COO]₂, perfluoropropionyl peroxides, (CF₃CF₂CF₂COO)₂, (CF₃CF₂COO)₂, {(CF₃CF₂CF₂)—[CF(CF₃)CF₂O]$_m$—CF(CF₃)—

$COO\}_2$ where m=0-8, $[ClCF_2(CF_2)_nCOO]_2$, and $[HCF_2(CF_2)_nCOO]_2$ where n=0-8; perfluoroalkyl azo compounds such as perfluoroazoisopropane, $[(CF_3)_2CFN=]_2$, $R^\square N=NR^\square$, where $R^\square$ is a linear or branched perfluorocarbon group having 1-8 carbons; stable or hindered perfluoroalkane radicals such as hexafluoropropylene trimer radical, $[(CF_3)_2CF]_2(CF_2CF_2)C^\bullet$ radical and perfluoroalkanes.

Redox systems, comprising at least two components forming a redox couple, such as dimethylaniline-benzoyl peroxide, diethylaniline-benzoyl peroxide and diphenylamine-benzoyl peroxide can also be used to initiate the polymerization.

Inorganic free radical initiators can be used and include, but are not limited to, the followings: persulfates, like sodium, potassium or ammonium persulfates, permanganates, like potassium permanganate.

Should the fluorinated monomer comprise TFE, in the process of the present invention, as the polymerization initiator, a redox polymerization initiator comprising a combination of a persulfate of an alkaline metal or ammonium with a Fe(II) salt as reducing agent (such as the Mohr salt), a halogen acid salt and a sulfite as described in U.S. Pat. No. 6,822,060 or a Ce(IV) salt/oxalic acid combination as described in U.S. Pat. No. 4,654,406 or a disuccinic acid peroxide (DSAP) and ammonium sulphite (AMS) combination as described in U.S. Pat. No. 4,766,188, can be notably used.

The halogen acid salt as above mentioned is represented by the general formula $YXO_3$ wherein X is a chlorine atom, a bromine atom or an iodine atom and Y is a hydrogen atom, ammonium, an alkali metal or an alkaline earth metal. The sulfite as above mentioned is represented by general formulae $Z'_2SO_3$ wherein Z is ammonium, an alkali metal or $Z''SO_3$ wherein Z" is an alkaline earth metal.

Among such redox radical initiators, a redox polymerization initiator comprising a persulfate of an alkaline metal or ammonium, preferably potassium or ammonium persulfate with a Fe(II) salt, preferably the Mohr salt (Iron (II) sulphate hexahydrate of formula $(NH_4)_2Fe(SO_4)_2 \cdot 6H_2O$) is preferred.

When said redox polymerization initiators are employed, both the components may be added simultaneously or sequentially to the reaction vessel. It is preferred that either one is preliminarily charged into the reaction vessel, then the other is intermittently or continuously added during the polymerization.

The polymerization may be also carried out in the presence of chain regulators or other polymerization additives, such as suspending agents, anti-fouling agents, and the like.

When a chain regulator is used, this is employed in the usual amounts. To be more specific, the chain regulators are generally used in an amount of about 0.5 to 5% by weight with respect to the fluorinated monomer(s) employed. The chain regulator may be employed all at the start of the polymerization or else in portions or continuously during polymerization.

As used herein, the term "polymer" encompasses oligomers and polymers, having molecular weight from $10^2$ to $10^8$; also the term encompasses homopolymers and copolymers, depending upon the number of monomers which are employed.

For the purpose of the present invention, the expressions "fluoropolymer" and "polymer (F)" are intended to denote any polymer comprising recurring units (R), more than 25% wt of said recurring units (R) being derived from at least one ethylenically unsaturated monomer comprising at least one fluorine atom (hereinafter, fluorinated monomer).

The fluoropolymer comprises preferably more than 30% wt, more preferably more than 40% wt of recurring units derived from the fluorinated monomer.

The fluorinated monomer can further comprise one or more other halogen atoms (Cl, Br, I). Shall the fluorinated monomer be free of hydrogen atom, it is designated as per(halo)fluoromonomer. Shall the fluorinated monomer comprise at least one hydrogen atom, it is designated as hydrogen-containing fluorinated monomer.

Non limitative examples of fluorinated monomers are notably tetrafluoroethylene (TFE), vinylidene fluoride (VdF), chlorotrifluoroethylene (CTFE), and mixtures thereof.

Optionally, the fluoropolymer may comprise recurring units derived one first monomer, said monomer being a fluorinated monomer as above described, and at least one other monomer [comonomer (CM), hereinafter].

Hereinafter, the term comonomer (CM) should be intended to encompass both one comonomer and two or more comonomers.

The comonomer (CM) can notably be either hydrogenated (i.e. free of fluorine atom) [comonomer (HCM), hereinafter] or fluorinated (i.e. containing at least one fluorine atom) [comonomer (FCM), hereinafter].

Non limitative examples of suitable hydrogenated comonomers (HCM) are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Non limitative examples of suitable fluorinated comonomers (FCM) are notably:
$C_3$-$C_8$ fluoro- and/or perfluoroolefins, such as hexafluoropropene, pentafluoropropylene, and hexafluoroisobutylene;
$C_2$-$C_8$ hydrogenated monofluoroolefins, such as vinyl fluoride;
1,2-difluoroethylene, vinylidene fluoride and trifluoroethylene;
perfluoroalkylethylenes complying with formula $CH_2=CH-R_{f0}$, in which $R_{f0}$ is a $C_1$-$C_6$ perfluoroalkyl;
chloro- and/or bromo- and/or iodo-$C_2$-$C_6$ fluoroolefins, like chlorotrifluoroethylene;
fluoroalkylvinylethers complying with formula $CF_2=CFOR_{f1}$ in which $R_{f1}$ is a $C_1$-$C_6$ fluoro- or perfluoroalkyl, e.g. $-CF_3$, $-C_2F_5$, $-C_3F_7$;
fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;
fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. $-CF_3$, $-C_2F_5$, $-C_3F_7$ or a $C_1$-$C_6$ (per)fluorooxyalkyl having one or more ether groups, like $-C_2F_5-O-CF_3$;
fluorodioxoles, of formula:

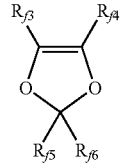

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

In a first embodiment of the invention, the polymer (F) is a hydrogen-containing fluoropolymer.

By "hydrogen-containing fluoropolymer" it is meant a fluoropolymer as above defined comprising recurring units derived from at least one hydrogen-containing monomer. Said hydrogen-containing monomer may be the same monomer as the fluorinated monomer or can be a different monomer.

Thus, this definition encompasses notably copolymers of one or more per(halo)fluoromonomer (for instance tetrafluoroethylene, chlorotrifluoroethylene, hexafluoropropylene, perfluoroalkylvinylethers, etc.) with one or more hydrogenated comonomer(s) (for instance ethylene, propylene, vinylethers, acrylic monomers, etc.), and/or homopolymers of hydrogen-containing fluorinated monomers (for instance vinylidene fluoride, trifluoroethylene, vinyl fluoride, etc.) and their copolymers with fluorinated and/or hydrogenated comonomers.

The hydrogen-containing fluoropolymer are preferably chosen among (F-1) TFE and/or CTFE copolymers with ethylene, propylene or isobutylene (preferably ethylene), with a molar ratio per(halo)fluoromonomer(s)/hydrogenated comonomer(s) of from 30:70 to 70:30, optionally containing one or more comonomers in amounts of from 0.1 to 30% by moles, based on the total amount of TFE and/or CTFE and hydrogenated comonomer(s) (see for instance U.S. Pat. No. 3,624,250 and U.S. Pat. No. 4,513,129);

(F-2) Vinylidene fluoride (VdF) polymers, optionally comprising reduced amounts, generally comprised between 0.1 and 15% by moles, of one or more fluorinated comonomer(s) (see for instance U.S. Pat. No. 4,524,194 and U.S. Pat. No. 4,739,024), and optionally further comprising one or more hydrogenated comonomer(s);

and mixtures thereof.

According to a second preferred embodiment of the invention; the polymer (F) is a per(halo)fluoropolymer.

For the purpose of the invention, the term "per(halo)fluoropolymer" is intended to denote a fluoropolymer substantially free of hydrogen atoms.

The term "substantially free of hydrogen atom" is understood to mean that the per(halo)fluoropolymer consists essentially of recurring units derived from ethylenically unsaturated monomers comprising at least one fluorine atom and free of hydrogen atoms [per(halo)fluoromonomer) (PFM)].

The per(halo)fluoropolymer can comprise recurring units comprising one or more other halogen atoms (Cl, Br, I).

The per(halo)fluoropolymer can be a homopolymer of a per(halo)fluoromonomer (PFM) or a copolymer comprising recurring units derived from more than one per(halo)fluoromonomer (PFM).

Non limitative examples of suitable per(halo)fluoromonomers (PFM) are notably:

$C_2$-$C_3$ perfluoroolefins, such as tetrafluoroethylene (TFE) and hexafluoropropene (HFP);

chloro- and/or bromo- and/or iodo-$C_2$-$C_6$ per(halo)fluoroolefins, like chlorotrifluoroethylene;

per(halo)fluoroalkylvinylethers complying with general formula $CF_2$=$CFOR_{f3}$ in which $R_{f3}$ is a $C_1$-$C_6$ per(halo)fluoroalkyl, such as —$CF_3$, —$C_2F_5$, —$C_3F_7$;

per(halo)fluoro-oxyalkylvinylethers complying with general formula $CF_2$=$CFOX_{01}$, in which $X_{01}$ is a $C_1$-$C_{12}$ per(halo)fluorooxyalkyl having one or more ether groups, like perfluoro-2-propoxy-propyl group;

per(halo)fluoro-methoxy-alkylvinylethers complying with general formula $CF_2$=$CFOCF_2OR_{f4}$ in which $R_{f4}$ is a $C_1$-$C_6$ per(halo)fluoroalkyl, such as —$CF_3$, —$C_2F_5$, —$C_3F_7$ or a $C_1$-$C_6$ per(halo)fluorooxyalkyl having one or more ether groups, such as —$C_2F_5$—O—$CF_3$, per(halo)fluorodioxoles of formula:

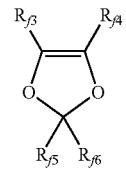

wherein each of $R_{f3}$, $R_{f4}$, $R_{f5}$, $R_{f6}$, equal to or different from each other, is independently a fluorine atom, a $C_1$-$C_6$ perfluoroalkyl group, optionally comprising one or more oxygen atom, e.g. —$CF_3$, —$C_2F_5$, —$C_3F_7$, —$OCF_3$, —$OCF_2CF_2OCF_3$; preferably a per(halo)fluorodioxole complying with formula here above, wherein $R_{f3}$ and $R_{f4}$ are fluorine atoms and $R_{f5}$ and $R_{f6}$ are perfluoromethyl groups (—$CF_3$) [perfluoro-2,2-dimethyl-1,3-dioxole (PDD)], or a per(halo)fluorodioxole complying with formula here above, wherein $Rf_3$, $R_{f5}$ and $R_{f6}$ are fluorine atoms and $R_{f4}$ is a perfluoromethoxy group (—$OCF_3$) [2,2,4-trifluoro-5-trifluoromethoxy-1,3-dioxole or perfluoromethoxydioxole (MDO)].

The per(halo)fluoropolymer is advantageously chosen among homopolymers of tetrafluoroethylene (TFE) or copolymers of TFE with at least one per(halo)fluoromonomer (PFM).

Preferred per(halo)fluoropolymer is selected among TFE homo- and copolymers comprising recurring units derived from at least one per(halo)fluoromonomer (PFM) chosen among the group consisting of:

1. perfluoroalkylvinylethers complying with formula $CF_2$=$CFOR_{f1'}$, in which $R_{f1'}$, is a $C_1$-$C_6$ perfluoroalkyl, e.g. —$CF_3$, —$C_2F_5$, —$C_3F_7$; and/or 2. per(halo)fluorodioxoles of formula:

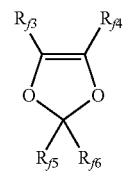

wherein each of $R_{f3}$, $R_{f4}$, $R_{f5}$, $R_{f6}$, equal to or different from each other, is independently a fluorine atom, a $C_1$-$C_6$ perfluoroalkyl group, optionally comprising one or more oxygen atom, e.g. —$CF_3$, —$C_2F_5$, —$C_3F_7$, —$OCF_3$, —$OCF_2CF_2OCF_3$.

More preferred per(halo)fluoropolymers are selected among TFE homo- and copolymers comprising recurring units derived from at least one fluorinated comonomer chosen among the group consisting of:
1. perfluoroalkylvinylethers complying with formula $CF_2=CFOR_{f7'}$, in which $R_{f7'}$ is a group chosen among $—CF_3$, $—C_2F_5$, $—C_3F_7$; and/or
2. per(halo)fluorodioxoles of formula:

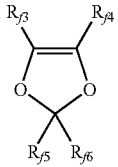

wherein $R_{f3}$ and $R_{f4}$ are fluorine atoms and $R_{f5}$ and $R_{f6}$ are perfluoromethyl groups ($—CF_3$) [perfluoro-2,2-dimethyl-1,3-dioxole (PDD)], or wherein $R_{f3}$, $R_{f5}$ and $R_{f6}$ are fluorine atoms and $R_{f4}$ is a perfluoromethoxy group ($—OCF_3$) [2,2,4-trifluoro-5-trifluoromethoxy-1,3-dioxole or perfluoromethoxydioxole (MDO)].

The per(halo)fluoromonomer (PFM) is present in the TFE copolymer in an amount of advantageously at least 0.01, preferably 0.1% by moles, with respect to the total moles of TFE and per(halo)fluoromonomer (PFM).

The per(halo)fluoromonomer (PFM) is present in the TFE copolymer in an amount of advantageously at most 3% by moles, preferably 1% by moles, with respect to the total moles of TFE and per(halo)fluoromonomer (PFM).

Good results have been obtained with TFE homo- and copolymers wherein the fluorinated comonomer is one or more than one perfluoroalkylvinylether as above specified; particularly good results have been achieved with TFE copolymers wherein the fluorinated comonomer is perfluoromethylvinylether (of formula $CF_2=CFOCF_3$), perfluoroethylvinylether (of formula $CF_2=CFOC_2F_5$), perfluoropropylvinylether (of formula $CF_2=CFOC_3F_7$) and mixtures thereof.

Best results have been obtained with TFE homo- and copolymers wherein the fluorinated comonomer is perfluoromethylvinylether, a mixture of perfluoromethylvinylether and perfluoropropylvinylether, a mixture of perfluoroethylvinylether and perfluoropropylvinylether, or perfluoropropylvinylether.

According to a preferred embodiment of the invention, the polymer (F) is a TFE copolymer as above described.

TFE homo- and copolymers which can be produced by the process of the invention are commercially available from Solvay Solexis S.p.A. under the trade name of ALGOFLON® PTFE.

The polymer (F) is advantageously non melt-processable.

For the purposes of the present invention, by the term "non melt-processable" is meant that the polymer (F) cannot be processed (i.e. fabricated into shaped articles such as films, fibres, tubes, wire coatings and the like) by conventional melt extruding, injecting or casting means. This generally requires that the melt viscosity at the processing temperature be more than $10^7$ poise, preferably in the range from $10^7$ to $10^{13}$ poise, and most preferably from $10^7$ to $10^{12}$ poise.

The melt viscosity of the polymer (F) can be measured according to the method described in AJROLDI, G., et al. Some Rheological Properties of molten Polytetrafluoroethylene. J. appl. polym. sci. 1970, vol. 14, p. 79-88. by tensile creep test at 360° C.; this method is particularly suitable for high viscosity compounds (melt viscosity exceeding $10^{10}$).

Otherwise, melt viscosity of the polymer (F) can be measured according to ASTM D-1238-52T, using a cylinder, orifice and piston tip made of a corrosion-resistant alloy, charging a 5.0 g sample to the 9.5 mm inside diameter cylinder which is maintained at a temperature exceeding melting point, extruding the sample 5 minutes after charging through a 2.10 mm diameter, 8.00 mm long square-edged orifice under a load (piston plus weight) of 5 kg. Melt viscosity is calculated in poise from the observable extrusion rate in grams per minute.

A wide variety of stirrers or impellers can be used in the mixing system of the process of the invention.

Impellers can be roughly divided into three broad classes as a function of the mixing flow they generate: axial-flow impellers, radial-flow impellers and mixed-flow impellers.

These stirrer types are arranged in FIG. 1 according to the predominant flow pattern they produce, impellers (A) to (F) predominantly yielding a radial (or tangential) flow, and impellers (G) to (N) predominantly yielding an axial (or vertical) flow.

Figure 2:
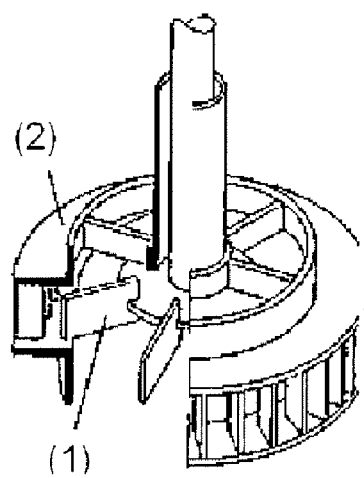
FIG. 2 shows a rotor-stator stirrer.
Figure 4:
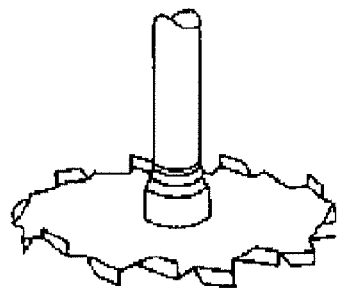
FIG. 4 shows a toothed disk.

Radial-flow impellers have blades which are generally parallel to the axis of the drive shaft. Non limitative examples of radial-flow impellers are notably:

the turbine stirrer, such as the Rushton turbine comprising six blades on a disk [impeller (A) of FIG. 1], which is advantageously a high-speed stirrer that typically sets the fluid in radial motion or, at higher viscosities, in tangential motion. This type of impeller is particularly effective with low-viscosity liquids and baffled vessels. For this type of impeller, the diameter ratio D/d (D=reactor vessel diameter; d=stirrer diameter) ranges advantageously from 3 to 5. During rotation, the turbine stirrer causes typically high levels of shear and is generally well suited to dispersion processes;

the impeller stirrer [impeller (B) of FIG. 1], which was notably developed in the past for use in enamel-coated vessels, and thus has rounded stirring arms. It is generally used in conjunction with small clearances from the bottom. For this type of impeller, the diameter ratio D/d ranges advantageously around 1.5 (that is to say between 1 and 2, preferably between 1.2 and 1.8), either with or without baffles. It can also operate with strongly fluctuating fill levels (e.g., during vessel discharging) because it is able to mix even small amounts of liquid;

the cross-beam impeller [impeller (C) of FIG. 1], the grid impeller [impeller (D) of FIG. 1], and the blade impeller [impeller (E) of FIG. 1], which advantageously belong to the group of low-speed stirrer types and are typically used with D/d from 1.5 to 2. They can operate with baffles or, especially for viscous media, without, and are especially well suited to homogenization;

the low-speed anchor stirrer [impeller (F) of FIG. 1], which is generally operated at very small clearances from the wall, that is to say at diameter ratio D/d from 1.005 to 1.5, preferably from 1.005 to 1.05 and is particularly appropriate for enhancing heat transfer in highly viscous media;

the stirrer operating on the rotor-stator principle or rotor-stator stirrer (FIG. 2), in which the rotor advantageously consists of a blade (1) or paddle stirrer (1) enclosed by a ring of baffles (stator) (2). As a result, high levels of shear are generally exerted on an extremely small volume;

the toothed disk (FIG. 4); using this stirrer, the liquid is advantageously accelerated radially in a thin ring away from the centre, and then quickly decelerated. High levels of shear can thus be achieved, even without a stator ring or baffles.

Figure 3:
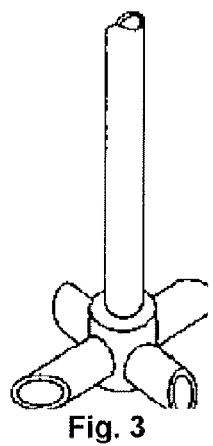
FIG. 3 shows a hollow stirrer.

Axial-flow and mixed flow impellers include all impeller in which the blade(s) make(s) an angle of less than 90° with the plane of rotation. Non limitative examples of said impellers are notably:

- the paddle stirrer with pitched blades (also known as pitched blade turbine) [impeller (G) of FIG. 1] and the propeller stirrer (also known as marine-type mixing propeller) [impeller (H) of FIG. 1], which typically belong to the group of high-speed mixers that advantageously generate an axial flow pattern. They are advantageously well suited to homogenization and suspension of solids and are typically used with D/d from 2 to 3.
- multistage stirrers with pitched stirring surfaces such as the cross-beam stirrer with pitched beams [impeller (I) of FIG. 1] and the MIG stirrer [impeller (L) of FIG. 1] and INTERMIG stirrer [impeller (M) of FIG. 1] of the Ekato company, Schopfheim, Germany, which are particularly suitable for enhancing the axial flow and/or for high liquid level to diameter ratios (H/D>1, wherein D=reactor vessel diameter; H=height of the liquid in the reactor vessel) are required. These stirrers are advantageously operated at low speeds. The diameter ratio for these stirrers D/d exceeds advantageously 1.5 when they are used in combination with baffles and is around 1.1 (that is to say between 1.005 and 1.5) when they are used without baffles.
- the low-speed helical ribbon stirrer [impeller (N) of FIG. 1], which is generally used with small wall clearances (D/d>1.05) and typically operated in such a way that it drives the liquid downwards along the wall;
- the hollow stirrer (FIG. 3), which typically has a hollow head and is connected through a hollow shaft to the gas-filled space above the liquid medium, And which is thus generally suitable for supplying a gas to a liquid; the suction generated behind the stirrer edges during rotation can be advantageously used to supply a gas in the reaction vessel.

Each of the impellers of the stirring system of the process of the invention is advantageously independently chosen among the group consisting of a turbine stirrer, an impeller stirrer, a grid impeller, a cross-beam impeller, a blade impeller, a low-speed anchor stirrer, a rotor-stator stirrer, a toothed disk, a paddle stirrer with pitched blades, a propeller stirrer, a multistage stirrer with pitched stirring surfaces, a low-speed helical ribbon stirrer and a hollow stirrer.

Preferably the stirring system comprise at least one paddle stirrer with pitched blades.

Preferably the stirring system comprises at least one impeller comprising at least one blade making an angle of advantageously less than 60°, preferably less than 50° and advantageously at least 20°, preferably at least 30°, most preferably at least 40° with the plane of rotation.

The stirring system used for mixing in the process of the invention comprises at least two counter-rotating impellers.

The term "two counter-rotating impellers" as used herein is intended to denote two impellers who rotate in the opposite direction, that is to say that one of them rotates clockwise and the other rotates counter-clockwise.

The stirring system may comprise two impellers or more than two (i.e. three, four or more impellers); should the stirring system comprise more that two impellers, it is essentially that at least one of them rotates in the opposite direction than the others.

Figure 7:
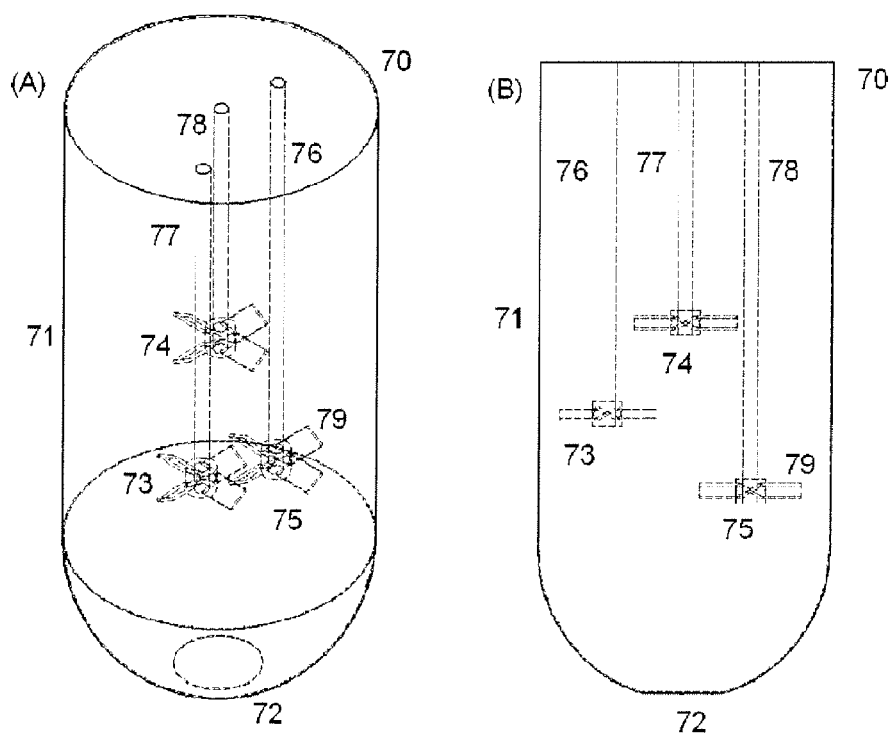
FIG. 7 shows a perspective view and a side view of a stirring system comprising three impellers.

FIG. 7 depicts an example of a stirring system comprising three impellers; (A) is a side-elevation view of the reaction vessel (70), while (B) is a section view of the same. In FIGS. 7 (A) and (B), reaction vessel (70), comprising walls (71) and bottom (72) so as to define a cylindrical shape having round bottom, is equipped with three paddle stirrers with pitched blades (73, 74, 75) mounted on three parallel rotation shafts (76, 77, 78); each of the impellers comprises four pitched blades (79) forming a 45° angle with the plane of the rotation. One of the impellers (73, 74, 75) rotates in an opposite direction with respect to the two others. For instance, impellers 74 and 75 rotate clockwise, while impeller 73 rotates counter-clockwise.

Preferably the stirring system comprises two counter-rotating impellers.

The impellers of the mixing system of the process of the invention can be of the same type or can be of different types. For instance, a paddle stirrer with pitched blades e.g. rotating clockwise can be used in combination with another paddle stirrer with pitched blades e.g. rotating counter-clockwise. As an alternative example, a paddle stirrer with pitched blades e.g. rotating clockwise can be used in combination with a propeller stirrer or a marine-type propeller stirrer e.g. rotating counter-clockwise.

Preferably, all the impellers are of the same type.

More preferably, the stirring system comprises two paddle stirrers with pitched blades; even more preferably, said paddle stirrers have pitched blades forming an angle of about 45° with the plane of rotation.

The impellers of the stirring system can have the same diameter or may have different diameter. In general, the impellers will have the same diameter. This layout will be particularly preferred when the impellers are of the same type.

Should the counter-rotating impellers rotate around the same rotational axis, they are designated as coaxial impellers; should they rotate around distinct rotational axes, they are designated as non-coaxial.

Should the impellers rotate around distinct rotational axis, said rotational axes are generally parallel.

Figure 8:
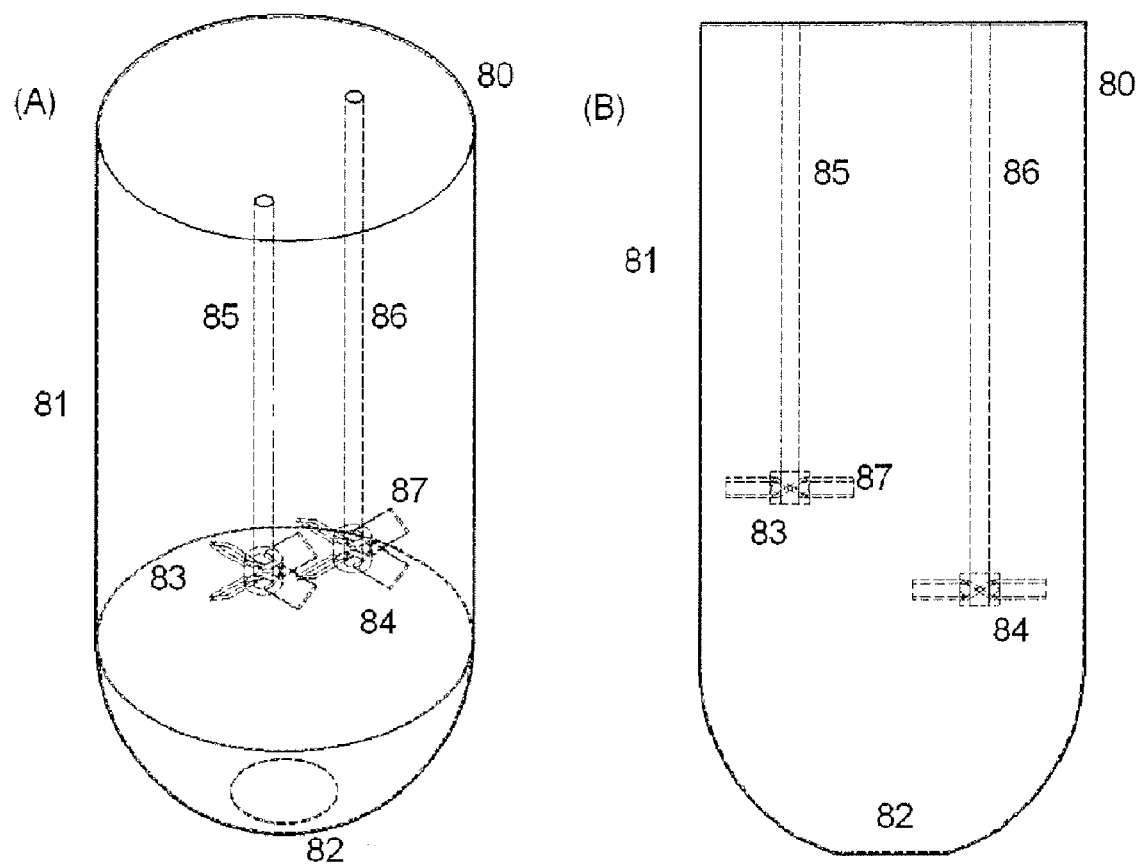
FIG. 8 shows a perspective view and a side view of a stirring system comprising impellers rotating around distinct parallel rotational axes.

FIG. 8 depicts an example of a stirring system comprising impellers rotating around distinct parallel rotational axes; (A) is a side-elevation view of the reaction vessel (80), while (B) is a section view of the same. In FIGS. 8 (A) and (B), reaction vessel (80), comprising walls (81) and bottom (82) so as to define a cylindrical shape having round bottom, is equipped with two paddle stirrer with pitched blades (83, 84) mounted on two parallel rotation shafts (85, 86); each of the impellers comprises four pitched blades (87) forming a 45° angle with the plane of the rotation. The reaction vessel is generally equipped with means for feeding monomer(s), initiators, liquid medium and other polymerization ingredients (not shown) and means for withdrawing the polymer suspension, generally from the vessel bottom (82) (not shown).

Preferably the impellers rotate around the same rotational axis, that is to say preferably they are coaxial.

Figure 5:
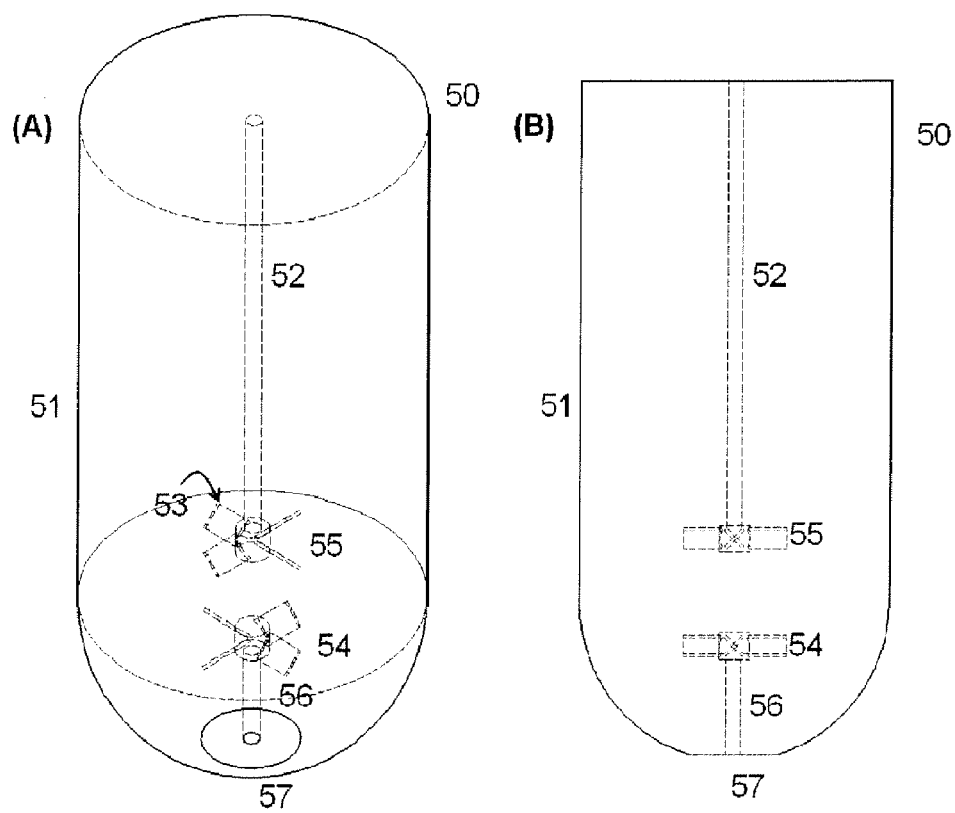
FIG. 5 shows a perspective view and a side view of a stirring system where the impellers are mounted on two separate coaxial rotation shafts.

According to a first embodiment of the invention, the impellers (54, 55) are mounted on separate coaxial shafts (52 and 56) in the reaction vessel (50); the impellers may be mounted as shown in FIG. 5 or may be mounted on the sides of the reaction vessel opposed to each other, that is to say that the axis of the shaft can be vertical, as depicted in FIG. 5 or horizontal. FIG. 5 depicts an example of the stirring system according to the first embodiment of the invention; (A) is a side-elevation view of the reaction vessel (50), while (B) is a section view of the same. In FIGS. 5 (A) and (B), reaction vessel (50), comprising walls (51) and bottom (57) so as to define a cylindrical shape having round bottom, is equipped with two paddle stirrer with pitched blades (54, 55) mounted on two separated coaxial rotation shafts (52, 56), the former (52) from the top of the vessel, the latter (56) from the bottom; each of the impellers comprises four pitched blades (53) forming a 45° angle with the plane of the rotation. The reaction vessel is generally equipped with means for feeding monomer(s), initiators, liquid medium and other polymerization ingredients (not shown) and means for withdrawing the polymer suspension, generally from the vessel bottom (57) (not shown).

Figure 6:
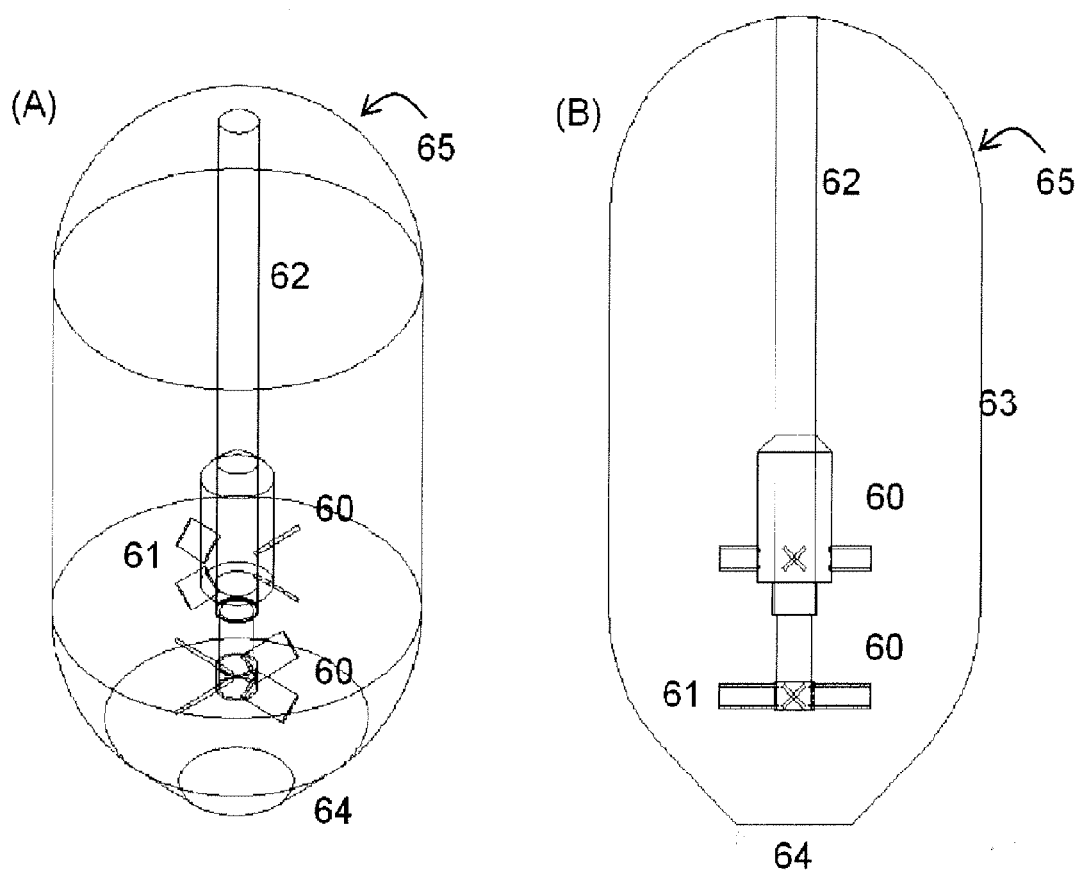
FIG. 6 shows a perspective view and a side view of a stirring system where the impellers are mounted on the same rotation shaft.

According to a second preferred embodiment of the invention, the impellers are mounted on the same rotation shaft (60) as shown in FIG. 6. FIG. 6 depicts an example of the stirring system according to the second preferred embodiment of the invention; (A) is a side-elevation view of the reaction vessel (65), while (B) is a section view of the same. In FIGS. 6 (A) and (B), reaction vessel (65), comprising walls (63) and bottom (64) so as to define a cylindrical shape having round bottom, is equipped with two paddle stirrer with pitched blades (60) mounted on the same rotation shaft (62); each of the impellers comprises four pitched blades (61) forming a 45° angle with the plane of the rotation. The reaction vessel is generally equipped with means for feeding monomer(s), initiators, liquid medium and other polymerization ingredients (not shown) and means for withdrawing the polymer suspension, generally from the vessel bottom (64) (not shown).

The impellers of the stirring system of the process of the invention can rotate at the same rotation speed or at a different rotation speed.

Of course, the speed of rotation of each impeller will be set as a function of the impeller type and the impeller and reaction vessel diameter according to good practices well-known to the skilled in the art.

It will be generally preferred that the energy density obtained with the stirring system is of advantageously at least 2 kW/m$^3$, preferably at least 2.5 kW/m$^3$, more preferably at least 3 kW/m$^3$.

Maximum energy density is not particularly critical. In general the energy density obtained with the stirring system is of advantageously at most 15 kW/m$^3$, preferably at most 12.5 kW/m$^3$, more preferably at most 10 kW/m$^3$.

The Applicant thinks, without this limiting the scope of his invention, that by means of the double stirring system of the invention it is advantageously possible to obtain, at given average energy density, an optimized distribution of said energy density throughout the entire reaction vessel, thus advantageously avoiding the presence of dead zones, wherein the local energy density is less than 2 kW/m$^3$, as generally observed with single stirring devices.

The speed of rotation of the impeller can vary in a broad domain; generally, speed of rotation of each of the impeller is of advantageously at least 150 rpm, preferably of at least 175 rpm, more preferably of at least 200 rpm and is of advantageously at most 1500 rpm, preferably of at most 1000 rpm, more preferably of at most 500 rpm.

In particular, for a reactor having a diameter of from 750 to 1000 mm, speed of rotation of the impeller is advantageously selected between 250 and 450 rpm.

Generally, speeds of rotation of the impellers are different and it is preferred that the upper impeller has a higher speed of rotation than the lower impeller(s).

In particular, for a reactor having a diameter of from 750 to 1000 mm, equipped with two coaxial counter-rotating impellers, speed of rotation of the lower impeller is advantageously selected between 280 and 360 rpm and speed of rotation of the upper impeller is advantageously selected between 300 and 400 rpm.

Another object of the invention is a fluoropolymer [polymer (F)] under the form of particles having a sphericity shape factor ($L_{max}/L_{min}$) of 1.5/1 or less and an angle of repose of 40° or less.

The process of the invention is particularly suitable for obtaining the fluoropolymer [polymer (F)] as above detailed; nevertheless, any other suitable process can be used for obtaining said polymer (F).

The sphericity shape factor of polymer (F) is, to the purpose of the invention, intended to denote the ratio ($L_{max}/L_{min}$) between the maximum dimension ($L_{max}$) of a particle and the minimum dimension ($L_{min}$) of the same, measured by image analysis from microscopy.

The particles of polymer (F) of the invention have a sphericity shape factor of advantageously 1.4/1 or less, preferably of 1.311 or less.

The particles of polymer (F) have an angle of repose of advantageously 39° or less, preferably 38° or less.

Figure 12:
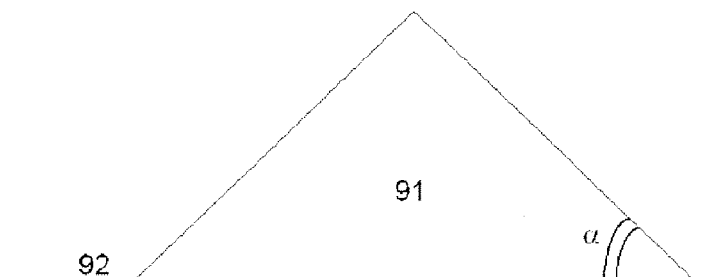
FIG. 12 shows the angle of repose between the edge of the pile and the horizontal surface, $\alpha$.

The angle of repose is a measurement of flowability of particulate polymer (F). When particles of polymer (F) are poured onto a horizontal surface, a conical pile will generally form. The angle between the edge of the pile and the horizontal surface is known as the angle of repose ($\alpha$ in FIG. 12) and is generally related to the density, surface area, morphology and coefficient of friction of the material. Material with a low angle of repose forms flatter piles than material with a high angle of repose.

The angle of repose can be determined according to ASTM D 6393-99 standard; according to this method, a stainless steel funnel (upper inner diameter: 40 mm, bottom inner diameter: 6 mm, height: 40 mm) with an orifice (inner diameter: 6 mm, length: 3 mm) is set above a horizontal plane (92) at a distance of 20 mm. The polymer (F) to be tested is introduced to the funnel, goes down through the funnel, and accumulates on the floor, yielding a conical pile (91); then the top of the accumulated powder reaches to the outlet of the funnel. Since the accumulated powder forms a conical pile (91), the angle of repose can be calculated according to the following equation by measuring bottom radius (mm) of the conical pile:

$$\text{Angle of repose}(\alpha) = \tan^{-1}(20/r)$$

The measurement was carried out at 23° C.

The polymer (F) of the invention, thanks to the sphericity shape factor and the angle of repose of its particles advantageously possesses adequate processing and flowability properties which make it suitable for processing, e.g. by automatic moulding or RAM extrusion, with no size reduction nor spheroidization (pelletization) pre-treatment.

Still an object of the invention is a moulding process for the manufacture of moulded articles, said process comprising:
(i) polymerising at least one fluorinated monomer in a polymerization medium, wherein said polymerization medium is mixed by means of a stirring system comprising at least two counter-rotating impellers, so as to obtain a fluoropolymer [polymer (F)]; and
(ii) compression moulding said polymer (F) to obtain a molded article, wherein the polymer (F) is not submitted to any size reduction step prior to compression moulding.

The features of the polymerization step (i) of the moulding process of the invention are those described for the polymerization process as above described.

Preferably, the fluoropolymer [polymer (F)] used in the moulding process as above detailed is the polymer (F) of the invention.

The term size reduction step is intended to encompass all treatments wherein the polymer (F) is submitted to conditions wherein its average particle size is modified and/or the morphology of the powder is modified (e.g. modification of sphericity shape factor and/or of the angle of repose).

Non limitative examples of size reduction steps well known to those skilled in the art are milling or grinding processes.

It is understood that the moulding process of the invention can comprise additional step, well-known to the skilled of the art. The moulding process can notably comprise a drying step, wherein the polymer (F) is separated from the polymerization medium, and/or a compounding step wherein the polymer (F) is mixed to additives like notably pigments, fillers, stabilizers.

In the moulding process of the invention the polymer (F) is preferably non melt-processable, as above described.

Should the polymer (F) be non melt-processable, the moulding process of the invention generally comprises the following steps:

(1) shaping the polymer (F) by the action of pressure as to obtain a preform;

(2) exposing said perform to a sintering treatment at a temperature of above 300° C. to obtain the moulded article.

TFE homopolymers and copolymer as above described are usually sintered at a temperature of above 340° C., preferably of above 350° C., more preferably of above 360° C.

The moulding process of the invention is particularly suitable for moulding TFE homopolymers and copolymers as above described.

According to a first embodiment of the invention, the moulding process comprises compression moulding the polymer (F) by automatic moulding.

In the automatic moulding, a mould is generally filled with polymer (F) from a storage hopper by means of a gravimetric or volumetric metering system.

The polymer (F) obtained from polymerization step (i) as above described advantageously possesses suitable free flowing properties to be used as such in the automatic moulding process; in particular polymer (F) can be advantageously fed using said gravimetric or volumetric metering systems with no risk of blocking the device, assuring advantageously homogeneous feeding rate.

According to a second embodiment of the invention; the moulding process comprises compression moulding by RAM extruding.

In the RAM extrusion, the polymer (F) is fed via a gravimetric or volumetric metering device into a cylindrical die tube and compressed with a ram, which forces the compacted material further along the tube to the sintering zone.

The polymer (F) obtained from polymerization step (i) as above described advantageously possesses suitable free flowing properties to be used as such in the RAM extrusion process; in particular polymer (F) can be advantageously fed using said gravimetric or volumetric metering systems with no risk of blocking the device, assuring advantageously homogeneous feeding rate.

The present invention will be described in greater detail with reference to the following examples, whose purpose is merely illustrative and not limitative of the scope of present invention.

Methods for Determining Perfluoropropylvinylether Content (PPVE)

The PPVE content was determined by IR spectroscopy, by measuring the absorption at 994 cm$^{-1}$ ($A_{994}$) on the 100 mg polymer pellet and calculating according to the formula:

$$PPVE(\% \text{ by weight}) = A_{994} \cdot (W \cdot 5.5)$$

wherein W=pellet weight by grams.

The amorphous index was determined by IR spectroscopy according to the Moynihan method (J. Am. Chem. Soc. 1959, 81, 1045) as a ratio of the $A_{778}$ and $A_{2653}$ absorptions according to the formula:

$$\text{Amorphous index} = A_{778}/A_{2365}$$

Method for Determining the Tensile Properties

For determining tensile characteristics, a cylindrical block having 90 mm diameter and a weight of 3 kg was moulded under a pressure of 300 kg/cm$^2$ and sintered at 370° C. with a pre-determined temperature programme. Specimens according to ASTM D638 method were prepared and stretched until break with deformation rate equal to 50 mm/min by a tensile dynamometer.

Method for Determining Optical and Homogeneity Characteristics

In order to determine optical and homogeneity characteristics, a 1 kg tubular block having 100 mm external diameter and 43 mm internal diameter was moulded under a pressure of 300 kg/cm$^2$. The tubular block was sintered at 370° C. and successively skived on a lathe in a tape (film) having 125 micron thickness. During the skiving, the tape homogeneity was evaluated by indicating with a visual method the presence of:

transparent halos, i.e. small points more transparent than the tape; and marbleizations, i.e. white zones with uncertain limits.

On the skived tape, the dielectric strength according to ASTM D 149 method and the optical characteristics (transmittance and haze) on a spherical Hazemeter according to ASTM D1003 method were determined.

Method for Determining the Sphericity Shape Factor

The sphericity shape factor was determined by image analysis of microscopic magnifications of polymer (F) particles. Shape factor was determined as an average of five determinations.

Method for Determining the Angle of Repose

The angle of repose can be determined according to ASTM D 6393-99 standard; according to this method, a stainless steel funnel (upper inner diameter: 40 mm, bottom inner diameter: 6 mm, height: 40 mm) with an orifice (inner diameter: 6 mm, length: 3 mm) was set above a horizontal plane (92) at a distance of 20 mm. The polymer (F) to be tested was introduced to the funnel, went down through the funnel, and accumulated on the floor, yielding a conical pile (91); then the top of the accumulated powder reached to the outlet of the funnel. Since the accumulated powder formed a conical pile (91), the angle of repose can be calculated according to the following equation by measuring bottom radius (mm) of the conical pile:

$$\text{Angle of repose}(\alpha) = \tan^{-1}(20/r)$$

The measurement was carried out at 23° C.

EXAMPLE 1

In a vertical autoclave having a total volume of 1100 liters equipped with a mixing system comprising two coaxial counter-rotating impellers (paddle stirrers with four pitched blades forming an angle of 45° with the plane of rotation, and having a diameter of 380 mm, for a D/d of 2.6), 480 l of demineralized and degassed water were introduced with the amounts specified in Tables 1 of the initiator (Ammonium persulphate, APS).

The autoclave top was evacuated from ambient air by connecting the autoclave to the vacuum line and subsequently refilling with a nitrogen flow. In the autoclave, the initial amount of comonomer (perfluoropropylvinylether (PPVE) see Tables 1) was introduced; the autoclave was then put under stirring at 330 rpm counter-clockwise rotating for the lower impeller and 360 rpm clockwise rotating for the upper impeller, and was pressurized at 17 bar with TFE. The autoclave was brought to the reaction temperature; this temperature was maintained constant for all the duration of the test. The reactor pressure was maintained constant by continuously feeding TFE.

Figure 9:
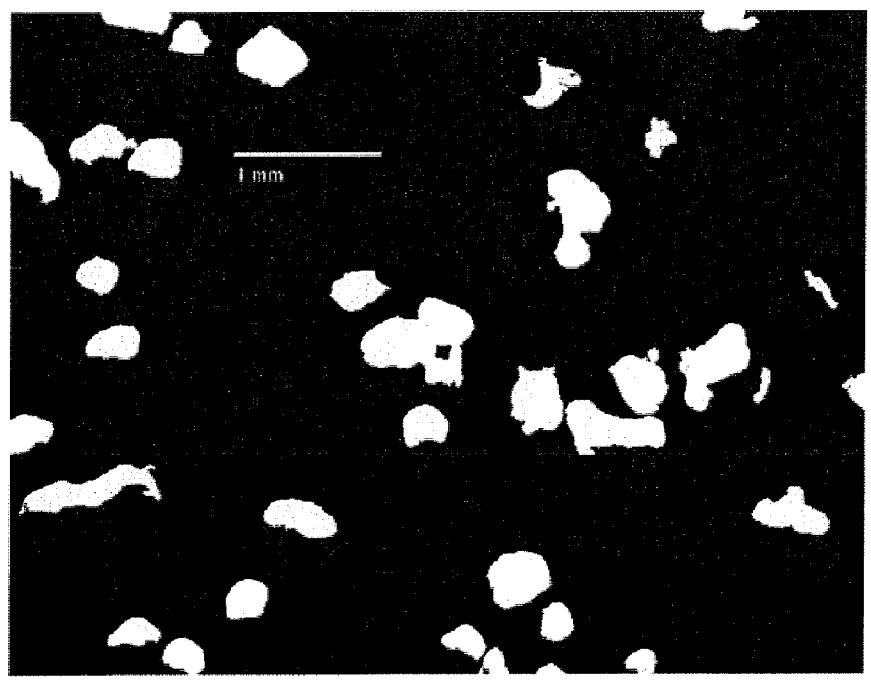
FIG. 9 is a picture of the product obtained in Example 1.

At the end of the reaction, the TFE was regulated so as to allow the system to react until the pressure decreases to the desired value, then the autoclave is depressurized. The polymer was discharged in the washer, the mother liquor was removed and the product was washed several times with demineralized water. The polymer successively was separated from the water by a vibrating screen and was dried in an oven at 210° C. The polymerization conditions, the reactants amounts and the results, in terms of particle shape and flowability are reported in Tables 2. A picture of obtained product is reported in FIG. 9. The energy density provided by the double stirring system was of 6.3 kW/m$^3$.

The dried product was found to be suitable for RAM extrusion and for automatic compression moulding.

EXAMPLE 2

In a vertical autoclave having a total volume of 1100 liters equipped with a mixing system comprising two coaxial counter-rotating impellers (paddle stirrers with four pitched blades forming an angle of 45° with the plane of rotation, and having a diameter of 380 mm, for a D/d of 2.6), 550 l of demineralized and degassed water were introduced with the amounts specified in Tables 1 of the redox initiator [Ammonium persulphate (APS) and Ammonium Ferrous Sulfate Hexahydrate of formula $(NH_4)_2Fe(SO_4)_2.6H_2O$, also known as Mohr salt]. The autoclave top was evacuated from ambient air by connecting the autoclave to the vacuum line and subsequently refilling with a nitrogen flow.

The autoclave was put under stirring at 325 rpm counter-clockwise rotating for the lower impeller and 390 rpm clockwise rotating for the upper impeller, and is pressurized at 17 bar with TFE During the pressurization the reducing agent was introduced in the desired amounts (see the Tables). The autoclave was brought to the reaction temperature; this temperature was maintained constant for all the duration of the test. The reactor pressure was maintained constant by continuously feeding TFE.

At the end of the reaction, the TFE feeding was regulated so as to allow the system to react until the pressure decreases to the desired value, then the autoclave is depressurized. The polymer was discharged in the washer, the mother liquor was removed and the product was washed several times with demineralized water. The polymer was successively separated from the water by a vibrating screen and was dried in an oven at 210° C.

Figure 10:
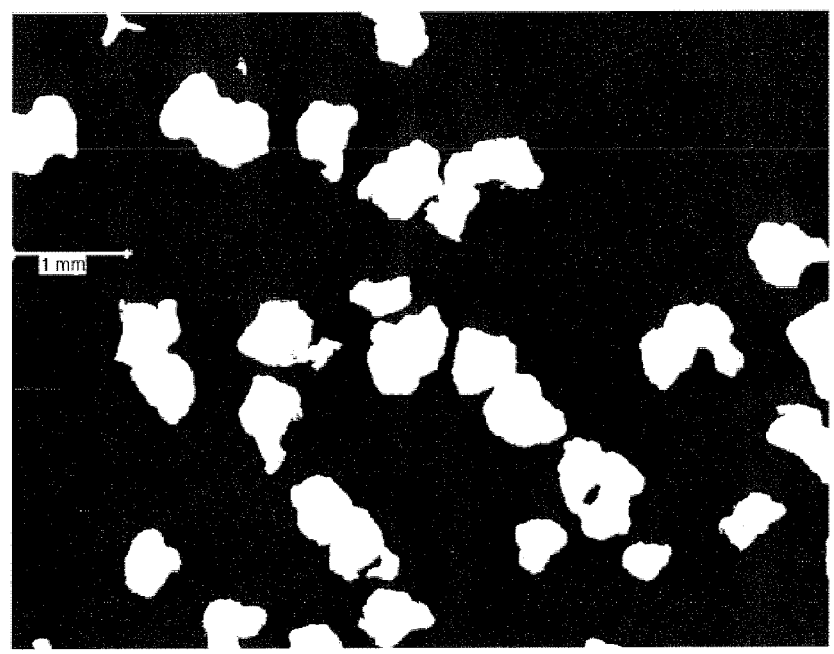
FIG. 10 is a picture of the product obtained in Example 2.

The polymerization conditions, the reactants amounts and the results, in terms of particle shape and flowability are reported in Tables 2. The energy density provided by the double stirring system was of 7.0 kW/m$^3$. A picture of obtained product is reported in FIG. 10.

The dried product was found to be suitable for RAM extrusion and for automatic compression moulding.

COMPARATIVE EXAMPLE 1

Example 1 was repeated but using a single standard paddle impeller without baffles, instead of the mixing system comprising two coaxial counter-rotating impellers. The polymerization conditions, the reactants amounts and the results, in terms of particle shape and flowability are reported in Tables 2.

The energy density provided by the standard stirring system was of 6.6 kW/m$^3$.

The dried polymer was milled in an air jets mill so as to obtain a powder having average weight diameter ($d_{50}$) of about 20 μm suitable for RAM extrusion.

COMPARATIVE EXAMPLE 2

Example 2 was repeated but using a single standard paddle impeller without baffle, instead of the mixing system comprising two coaxial counter-rotating impellers.

Figure 11:
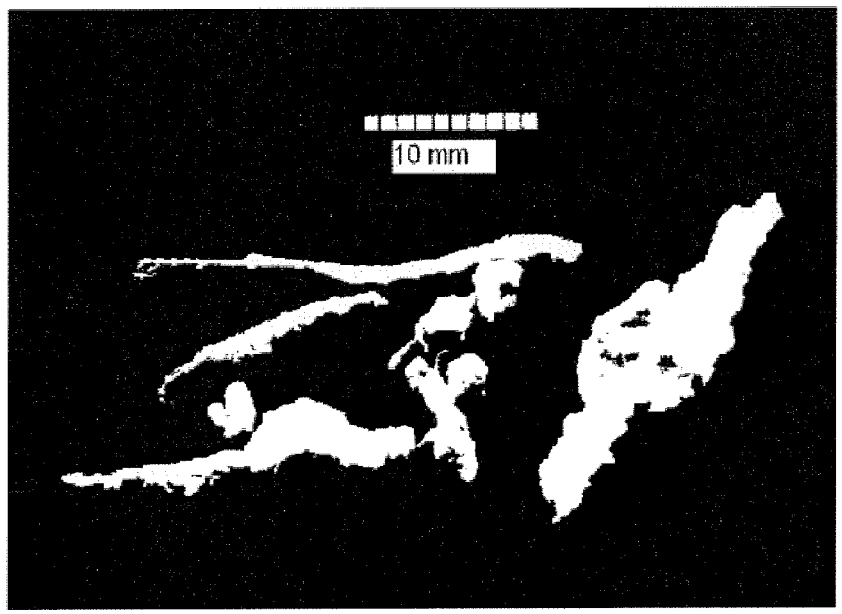
FIG. 11 is a picture of the product obtained in Comparative Example 2.

The polymerization conditions, the reactants amounts and the results, in terms of particle shape and flowability are reported in Table 2. A picture of obtained product is reported in FIG. 11.

The energy density provided by the standard stirring system was of 6.6 kW/m$^3$.

The dried polymer was milled in an air jets mill so as to obtain a powder having average weight diameter ($d_{50}$) of about 20 μm suitable for RAM extrusion.

TABLE 1

| Ex. | Mixing system[1] | P (bar) | T (° C.) | APS[2] (g) | MS[3] (g) | PPVE[4] (g) | Conversion (kg $C_2F_4$) | time (min) |
|---|---|---|---|---|---|---|---|---|
| 1 | A | 17 | 64 | 3.6 | 0 | 260 | 239 | 250 |
| 2 | A | 17 | 39 | 1.5 | 2.28 | — | 245 | 80 |
| C1 | B | 17 | 64 | 3.6 | 0 | 260 | 241 | 245 |
| C2 | B | 17 | 39 | 1.5 | 2.28 | — | 242 | 75 |

[1]A denotes the mixing system comprising two coaxial counter-rotating impellers; B denotes a standard single paddle impeller.
[2]APS: ammonium persulfate of formula $(NH4)_2Fe(SO_4)_2 H_2O$;
[3]MS: Mohr salt of formula: $(NH_4)_2Fe(SO_4)_2 \cdot 6H_2O$;
[4]PPVE: perfluoropropylvinylether of formula: $CF_2=CF-O-C_3F_7$.

TABLE 2

| Example | Flowability ranking | angle of repose (°) | shape ranking | ($L_{max}/L_{min}$) |
|---|---|---|---|---|
| 1 | good | 39 | spherical | 1.3/1 |
| 2 | good | 38 | spherical | 1.3/1 |
| C1 | bad | 44 | Rod-like | 12/1 |
| C2 | very bad | 46 | Rod-like | 24/1 |

TABLE 3

| Ex. | TH | MAR | $CR_T$ (MPa) | $CR_L$ (MPa) | $Ar_{T\,(\%)}$ | $Ar_{L\,(\%)}$ | PPVE (% wt) | $d_{50\,(\mu m)}$ | DS (kV/mm) |
|---|---|---|---|---|---|---|---|---|---|
| 1 | No | No | 44 | 43.5 | 560 | 575 | 0.14 | 22 | 105 |
| C1 | yes | yes | 38 | 36 | 460 | 440 | 0.14 | 22 | 83 |

TH: transparent halos;
MAR: Marbleizations;
$CR_T$: strength at break in the transverse direction;
$CR_L$: strength at break in the longitudinal direction;
$Ar_T$: elongation at break in the transverse direction;
$Ar_L$: elongation at break in the longitudinal direction;
PPVE: perfluoropropylvinylether content;
$d_{50}$: average particle size;
DS: dielectric strength.

The invention claimed is:

1. A polymerisation process for the manufacture of a fluoropolymer, polymer (F), said process comprising polymerising at least one fluorinated monomer in a polymerization medium, wherein said polymerization medium is mixed by means of a stirring system comprising at least two counter-rotating impellers, wherein at least one of the impellers comprises at least one blade making an angle of at least 20° with the plane of rotation.

2. The process according to claim 1, wherein each of the impellers is independently selected from the group consisting of a turbine stirrer, an impeller stirrer, a grid impeller, a cross-beam impeller, a blade impeller, a low-speed anchor stirrer, a rotor-stator stirrer, a toothed disk, a paddle stirrer with pitched blades, a propeller stirrer, a multistage stirrer with pitched stirring surfaces, a low-speed helical ribbon stirrer, and a hollow stirrer.

3. The process according to claim 1, wherein the stirring system comprises at least one impeller comprising at least one blade making an angle of less than 60° with the plane of rotation.

4. The process according to claim 1, wherein the process is carried out in suspension.

5. The process according to claim 1, wherein said process comprising polymerizing the fluorinated monomer in the presence of a radical initiator.

6. The process according to claim 1, wherein the polymer (F) is a per(halo)fluoropolymer.

7. The process according to claim 6, wherein the per(halo) fluoropolymer is selected from the group consisting of homopolymers of tetrafluoroethylene (TFE) and copolymers of TFE with at least one per(halo)fluoromonomer (PFM).

8. The process according to claim 7, wherein the per(halo) fluoropolymer is selected from the group consisting of TFE homo- and copolymers comprising recurring units derived from at least one per(halo)fluoromonomer (PFM), the at least one per(halo)fluoromonomer (PFM) being selected from the group consisting of:

1. perfluoroalkylvinylethers complying with formula $CF_2=CFOR_{f1'}$, in which $R_{f1'}$ is a $C_1$-$C_6$ perfluoroalkyl and/or
2. per(halo)fluorodioxoles of formula:

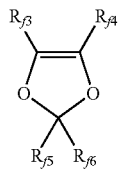

wherein each of $R_{f3}$, $R_{f4}$, $R_{f5}$, $R_{f6}$, equal or different from each other, is independently a fluorine atom, a $C_1$-$C_6$ perfluoroalkyl group, optionally comprising one or more oxygen atom.

9. A moulding process for the manufacture of a moulded article, said process comprising:
(i) polymerising at least one fluorinated monomer in a polymerization medium, wherein said polymerization medium is mixed by means of a stirring system comprising at least two counter-rotating impellers, wherein at least one of the impellers comprises at least one blade making an angle of at least 20° with the plane of rotation, so as to obtain a fluoropolymer, polymer (F); and
(ii) compression moulding said polymer (F) to obtain a moulded article, wherein the polymer (F) is not submitted to any size reduction step prior to compression moulding.

* * * * *